US012592613B2

(12) United States Patent
Long et al.

(10) Patent No.: US 12,592,613 B2
(45) Date of Patent: Mar. 31, 2026

(54) CLOSED-CIRCUIT ROTOR COOLING ARRANGEMENT AND ELECTRIC MACHINE HAVING SAME

(71) Applicant: Deere & Company, Moline, IL (US)

(72) Inventors: Randall L. Long, Coffeyville, KS (US); Stacy K. Worley, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 223 days.

(21) Appl. No.: 18/476,572

(22) Filed: Sep. 28, 2023

(65) Prior Publication Data

US 2025/0112524 A1 Apr. 3, 2025

(51) Int. Cl.
*H02K 9/197* (2006.01)
*B60K 7/00* (2006.01)
(Continued)

(52) U.S. Cl.
CPC ............. *H02K 9/197* (2013.01); *H02K 1/276* (2013.01); *H02K 1/32* (2013.01); *H02K 21/14* (2013.01);
(Continued)

(58) Field of Classification Search
CPC .............. B60K 11/02; B60K 2001/006; B60K 2007/0092; B60K 7/0007; H02K 1/276;
(Continued)

(56) References Cited

U.S. PATENT DOCUMENTS 3,280,353 A * 10/1966 Haydon ................. H02K 5/145
310/268
7,545,060 B2 6/2009 Ward
(Continued)

FOREIGN PATENT DOCUMENTS

DE 102019211523 A1 2/2021
DE 102019211555 A1 2/2021
(Continued)

OTHER PUBLICATIONS

German Search Report issued in application No. 102024117683.0 dated May 9, 2025, 06 pages.
(Continued)

*Primary Examiner* — Alex W Mok
(74) *Attorney, Agent, or Firm* — KLINTWORTH & ROZENBLAT LLP

(57) ABSTRACT

A rotor cooling arrangement is provided for an electric machine used in a drive train of a work vehicle. The electric machine has a housing containing a stator disposed within the housing in a fixed position about a rotation axis. The rotor cooling arrangement includes a rotor disposed within the housing about the rotation axis. The rotor has a series of rotor discs with pockets in which magnets are disposed. The rotor discs are separated from each other along the rotation axis by a dielectric. A rotor shaft extends along the rotation axis and couples to the rotor discs to corotate relative to the stator about the rotation axis. The rotor shaft defines, in part, a cooling circuit through which flows coolant for cooling the rotor. The cooling circuit includes a feed passage internal to the rotor shaft that communicates with a cooling passage, in the form of an open groove in an outer surface of the rotor shaft, that communicates with an outlet opening spaced along the rotation axis from the rotor. The rotor closes off the open groove such that the cooling circuit is a closed loop circuit in which coolant circulates through the rotor shaft
(Continued)

from the feed passage to the cooling passage to the outlet opening.

20 Claims, 9 Drawing Sheets

(51) Int. Cl.

| | | |
|---|---|---|
| *B60K 11/02* | (2006.01) | |
| *H02K 1/276* | (2022.01) | |
| *H02K 1/32* | (2006.01) | |
| *H02K 21/14* | (2006.01) | |

(52) U.S. Cl.
CPC .... *B60K 7/0007* (2013.01); *B60K 2007/0092* (2013.01); *B60K 11/02* (2013.01)

(58) Field of Classification Search
CPC ........ H02K 1/2766; H02K 1/32; H02K 21/14; H02K 5/203; H02K 9/19; H02K 9/197
USPC .......................................................... 310/54
See application file for complete search history.

(56) References Cited

U.S. PATENT DOCUMENTS

| | | | | |
|---|---|---|---|---|
| 9,627,943 | B2 * | 4/2017 | Tokunaga | H02K 1/32 |
| 9,787,164 | B2 * | 10/2017 | Büttner | H02K 17/168 |
| 10,214,101 | B2 | 2/2019 | Fliearman et al. | |
| 11,303,183 | B2 * | 4/2022 | Downs | H02K 7/003 |
| 11,309,770 | B2 * | 4/2022 | Van Seventer | H02K 5/203 |
| 2014/0246933 | A1 * | 9/2014 | Chamberlin | H02K 5/203 |
| | | | | 310/54 |
| 2015/0288255 | A1 * | 10/2015 | Barker | H02K 1/2781 |
| | | | | 310/43 |
| 2020/0177054 | A1 * | 6/2020 | Van Seventer | H02K 9/00 |
| 2021/0309099 | A1 | 10/2021 | Long | |
| 2021/0351664 | A1 * | 11/2021 | Jackson | H02K 7/006 |
| 2022/0037954 | A1 * | 2/2022 | Downs | H02K 1/20 |

FOREIGN PATENT DOCUMENTS

| | | | | |
|---|---|---|---|---|
| DE | 102019214292 | A1 | 3/2021 | |
| DE | 102020207431 | A1 * | 12/2021 | H02K 7/003 |
| EP | 0985262 | A1 | 3/2000 | |
| EP | 2961043 | B1 | 12/2015 | |
| JP | 2006325369 | A | 11/2006 | |

OTHER PUBLICATIONS

Fabbaloo, A Much Better Soluble Support Material, @ https://www.fabbaloo.com/2020/02/a-much-better-soluble-support-material, Feb. 4, 2020, Copyright Terran Data Corporation 2021 (12 pages).
3D Printing Spot, Can You Dissolve Polylactic Acid (PLA)? Is it Possible?, @ https://www.3dprintingspot.com/post/can-you-dissolve-polylactic-acid-pla-is-it-possible, updated Sep. 16, 2021 (15 pages).
Utility U.S. Appl. No. 17/654,128, filed Mar. 9, 2022 (38 pages).
Utility U.S. Appl. No. 17/663,083, filed May 12, 2022 (31 pages).

* cited by examiner

CLOSED-CIRCUIT ROTOR COOLING ARRANGEMENT AND ELECTRIC MACHINE HAVING SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to electric machines, such as those used in various systems (e.g., drive trains) of work vehicles, and more specifically to cooling of such electric machines.

BACKGROUND OF THE DISCLOSURE

Heavy-duty work vehicles, such as those used in the agricultural, construction, forestry, and mining industries, may utilize various propulsion systems and drive trains to provide tractive power to the ground-engaging wheels or tracks for travel and work operations of the work vehicle. Various drive units or axle arrangements may utilize electric machines as the sole, or for supplementary, drive power. For example, end drive units, sometimes referred to as final drives or wheel end drives, may utilize electric machines to power deep-ratio gear sets to facilitate high torque at the ground-engaging wheels or tracks. Effective cooling of the electric machines is required to achieve optimal operating performance and life of the electric machines. Gravity-based cooling arrangements allow for effective cooling of portions of the electric machines (e.g., the stators) but require sumps and may induce inefficiencies during operation. For example, to reduce windage losses, the rotor cooling may be rather limited to splash cooling or not cooled at all.

SUMMARY OF THE DISCLOSURE

The disclosure provides an improved rotor cooling arrangement and an electric machine therewith.

In particular, the disclosure provides a rotor cooling arrangement for an electric machine used in a drive train of a work vehicle in which the electric machine has a housing containing a stator disposed within the housing in a fixed position about a rotation axis. The rotor cooling arrangement includes a rotor disposed within the housing about the rotation axis. The rotor has a series of rotor discs with pockets in which magnets are disposed. The rotor discs are separated from each other along the rotation axis by a dielectric. A rotor shaft extends along the rotation axis and couples to the rotor discs to corotate relative to the stator about the rotation axis. The rotor shaft defines, in part, a cooling circuit through which flows a coolant for cooling the rotor. The cooling circuit includes a feed passage internal to the rotor shaft communicating with a cooling passage, in the form of an open groove in an outer surface of the rotor shaft, communicating with an outlet opening spaced along the rotation axis from the rotor. The rotor closes off the open groove such that the cooling circuit is a closed loop circuit in which the coolant circulates through the rotor shaft from the feed passage to the cooling passage to the outlet opening.

In these and other embodiments, the rotor is physically adjacent to the cooling passage such that the coolant within the cooling passage comes in direct physical contact with the rotor discs. A first seal may be configured to effect a first liquid seal tight between the rotor shaft and a first side of the rotor, and a second seal may be configured to effect a second liquid tight seal between the rotor shaft and a second side of the rotor. The cooling passage is disposed about the rotation axis between the first seal and the second seal.

In these and other embodiments, there are multiple cooling passages formed as open grooves in the outer surface of the rotor shaft, and there are multiple outlet openings. The cooling passages include multiple sets of convolutions, each of the sets of convolutions communicate with the feed passage and one of the outlet openings. Each of the sets of convolutions includes one or more parallel runs of the cooling passages. The parallel runs are aligned with the rotation axis. Each of the sets of convolutions is physically isolated from the other sets of convolutions in an angular direction about the rotation axis and an axial direction along the rotation axis by the dielectric of the rotor.

In these and other embodiments, the rotor shaft has a multi-sided cross section defining multiple elongated facets at each of which is located one of the sets of convolutions. The rotor shaft defines a first annular surface and a second annular surface with the cooling passages disposed about the rotation axis between the first annular surface and the second annular surface. A first seal is configured to effect a first liquid tight seal between the first annular surface of the rotor shaft at a first side of the rotor, and the second seal is configured to effect a second liquid tight seal between the second annular surface of the rotor shaft at a second side of the rotor.

Another aspect of this disclosure provides an electric machine for use in a drive train of a work vehicle. The electric machine has a housing, a stator disposed within the housing in a fixed position about a rotation axis, and a rotor disposed within the housing about the rotation axis. The rotor has a series of rotor discs with pockets in which magnets are disposed. The rotor discs are separated from each other along the rotation axis by a dielectric. A rotor shaft extends along the rotation axis and couples to the rotor discs to corotate relative to the stator about the rotation axis. The rotor shaft defines, in part, a cooling circuit through which flows a coolant for cooling the rotor. The cooling circuit includes a feed passage internal to the rotor shaft communicating with a cooling passage, in the form of an open groove in an outer surface of the rotor shaft, communicating with an outlet opening spaced along the rotation axis from the rotor. The rotor closes off the open groove such that the cooling circuit is a closed loop circuit in which the coolant circulates through the rotor shaft from the feed passage to the cooling passage to the outlet opening. Various of the aforementioned embodiments of the rotor cooling arrangement may be incorporated in the electric machine.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
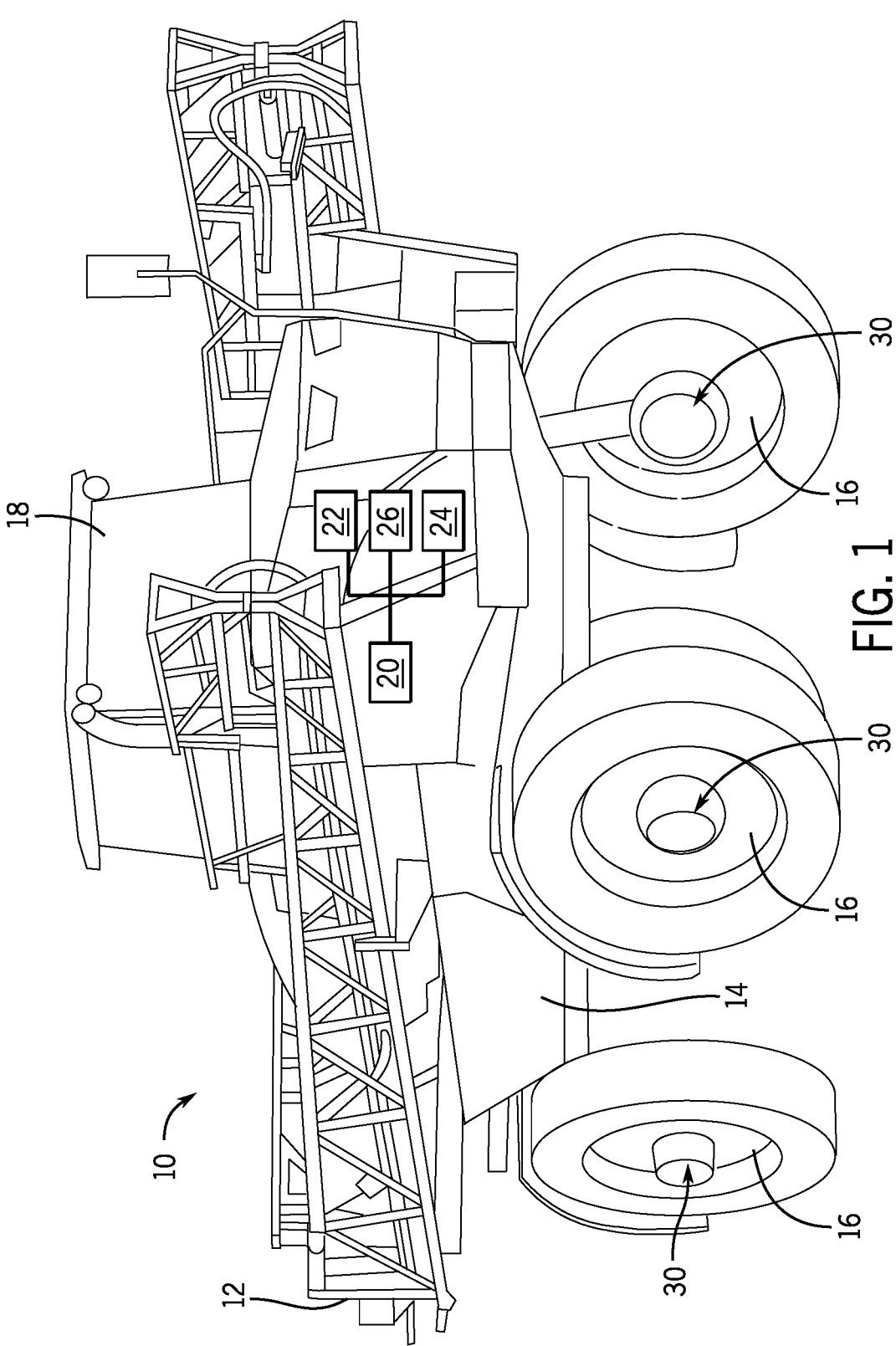
FIG. 1 is an example work vehicle in the form of an agricultural sprayer in which the rotor cooling arrangement and electric machine of the present disclosure may be incorporated.

The following describes one or more example embodiments of the disclosed electric machine and rotor cooling arrangement, as shown in the accompanying figures of the drawings described briefly above. Various modifications to the example embodiments may be contemplated by one of skill in the art. Discussion herein focuses 11 on the electric machine being a part of wheel end drive for a work vehicle, such as an agricultural sprayer, but the disclosed electric machine may be utilized in other contexts, including other drive or work components and other work vehicle platforms in the agriculture, construction, forestry, mining, and other industries.

Overview

Modern work vehicles are being electrified increasingly to reduce the carbon output of the machines for environmental reasons. A significant concern in these electrification efforts is the cooling of the electric machines. Air cooling may not be sufficiently effective. Liquid cooling may need direct contact to effectively cool the heated components of the electric machine. Direct fluid contact may require draining the coolant from the system. Cooling jackets may be employed to contain the coolant; however, such jackets may be configured for placement between the stator and the housing of the electric machine, and thus are suitable for cooling the stator effectively but not the rotor.

To address this issue, the present disclosure provides an improved rotor cooling arrangement for an electric machine. The rotor cooling arrangement includes a rotor disposed within the electric machine housing and mounted for rotation about the rotation axis. The rotor has a series of rotor discs, with magnet-receiving pockets, and a rotor shaft that extends along the rotation axis and supports the rotor disks corotate relative to the stator about the rotation axis. The rotor disks are separated from each other along the rotation axis by small gaps. The rotor disc assembly is encapsulated in a dielectric material including along an outer periphery of the rotor discs and along the radial faces of the rotor discs filling the gaps therebetween. The rotor discs, being of annular configuration having inner and outer diameters, may also have their inner diameters coating with dielectric material. The rotor assembly is an encapsulated assembly through which coolant may be passed in a contained manner.

The coolant may be circulated through the encapsulated rotor assembly in various ways. The rotor shaft may define a significant, for example majority, of a cooling circuit through which flows a coolant for cooling the rotor. The cooling circuit may include a feed passage internal to the rotor shaft that communicates with a cooling passage. The cooling passage may be in the form of an open groove in an outer surface of the rotor shaft and that communicates with an outlet opening spaced along the rotation axis from the rotor. The physical abutment of the rotor discs and the dielectric with the rotor shaft closes off the open groove such that the cooling circuit is a closed loop circuit in which the coolant circulates through the rotor shaft from the feed passage to the cooling passage to the outlet opening.

In various embodiments, the rotor, that is, the rotor discs and the dielectric, are physically adjacent to the cooling passage such that the coolant within the cooling passage comes in direct physical contact with the rotor discs. A first seal may be configured to effect a first liquid tight seal between the rotor shaft and a rotor disc at a first side of the rotor, and a second seal may be configured to effect a second liquid tight seal between the rotor shaft and a rotor disc at a second side of the rotor. The cooling passage is disposed about the rotation axis between the first seal and the second seal.

In various embodiments, there are multiple cooling passages formed as open grooves in the outer surface of the rotor shaft, and there are multiple outlet openings. The cooling passages include multiple sets of convolutions, each of the sets of convolutions communicate with the feed passage and one of the outlet openings. Each of the sets of convolutions includes one or more parallel runs of the cooling passages. The parallel runs may be aligned with the rotation axis to extend in an axial direction. Each of the convolutions is physically isolated from the other sets of convolutions in an angular direction about the rotation axis and an axial direction along the rotation axis by the dielectric of the rotor. The convolutions form a continuous flow circuit for coolant to flow from one convolution to the next, for example, in series or in parallel.

In various embodiments, the rotor shaft has a multi-sided or multi-faceted cross section defining multiple elongated sides or facets at each of which is located one of the convolutions. The rotor shaft defines a first smooth annular surface and a second smooth annular surface on opposite axial sides of the faceted section of the rotor shaft such that the cooling passages are disposed about the rotation axis between the first annular surface and the second annular surface. A first seal is configured to effect a first liquid tight seal between the first annular surface of the rotor shaft at a first side of the rotor, and the second seal is configured to effect a second liquid tight seal between the second annular surface of the rotor shaft at a second side of the rotor.

These and other aspects of the disclosed electric machine with rotor cooling arrangement will be better understood with regard to the example that will now be described.

Example Electric Machine with Rotor Cooling Arrangement

Referring to FIG. 1, an example work vehicle 10 in the form of a self-propelled vehicle (e.g., an agricultural sprayer) houses or otherwise supports a sprayer system 12. The work vehicle 10 may be either a manned or autonomous vehicle. As is known, the sprayer system 12 may be primarily implemented to distribute and/or disperse a primary fluid (e.g., fertilizer, insecticide, water, or other fluid) across a geographical area (e.g., a field). The sprayer system 12 may include a fluid source and a pump coupled to a plurality of spray nozzles via an arrangement of plumbing lines, which generally corresponds to the system or array of lines, conduits, valves, tanks, and the like that facilitate flow of primary fluid (and other fluids) within the sprayer system 12.

Generally, the work vehicle 10 may include a vehicle frame or chassis 14 that is supported off the ground by ground-engaging wheels or tracks 16 and which supports a cab 18 and power train (e.g., an engine or one or more electric motors) that generates power for propulsion and work operations to be performed by the work vehicle 10. The power train may drive a drive train of the work vehicle 10 that May include a transmission, steering system, and the like for advancing and maneuvering the work vehicle 10, either autonomously or based on commands by an operator. The work vehicle 10 may include various other components or systems that are typical on work vehicles, including actuation systems, lubrication and cooling systems, battery systems, exhaust treatment systems, braking systems, and the like.

The work vehicle 10 may further include a vehicle controller 20 (or multiple controllers) to control various aspects of the operation of the work vehicle 10. For example, the vehicle controller 20 may facilitate automatic or manual maneuvering of the work vehicle 10 traversing the field and actuation of the sprayer system 12. Generally, the vehicle controller 20 (or others) may be configured as a computing device with associated processor devices and memory architectures, as a hard-wired computing circuit (or circuits), as a programmable circuit, as a hydraulic, electrical or electrohydraulic controller, or otherwise. As such, the vehicle controller 20 may be configured to execute various computational and control functionalities with respect to the work vehicle 10. In some embodiments, the vehicle controller 20 may be configured to receive input signals in various formats from a number of sources (e.g., including from the operator via operator interfaces 22 and various sensors 24, as well as units and systems onboard or remote from the work vehicle 10); and in response, the vehicle controller 20 generates one or more types of commands for implementation by the various systems on or outside the work vehicle 10. Information collected by the sensors 24 associated with the work vehicle 10 may be provided to the vehicle controller 20 for evaluation and, if necessary or desired, for actuation in response.

In some embodiments, the vehicle controller 24 may be configured to receive input commands and to interface with an operator via the operator interfaces 22 in the form of one or more operator input devices and/or one or more display devices, which may be disposed inside the cab 18 of the work vehicle 10 for easy access by the vehicle operator. The input devices of the operator interfaces 22 may be configured in a variety of ways, including one or more joysticks, various switches or levers, one or more buttons, a touchscreen interface, a keyboard, a speaker, a microphone associated with a speech recognition system, or various other human-machine interface devices. A display device 26 may be implemented as a flat panel display or other display type that is integrated with an instrument panel or console of the work vehicle 10. As such, the display device 26 may include any suitable technology for displaying information, including, but not limited to, a liquid crystal display (LCD), light emitting diode (LED), organic light emitting diode (OLED), plasma, or a cathode ray tube (CRT). In some examples, the display device 26 may function to provide information associated with the work vehicle 10 and the sprayer system 12.

Figure 2:
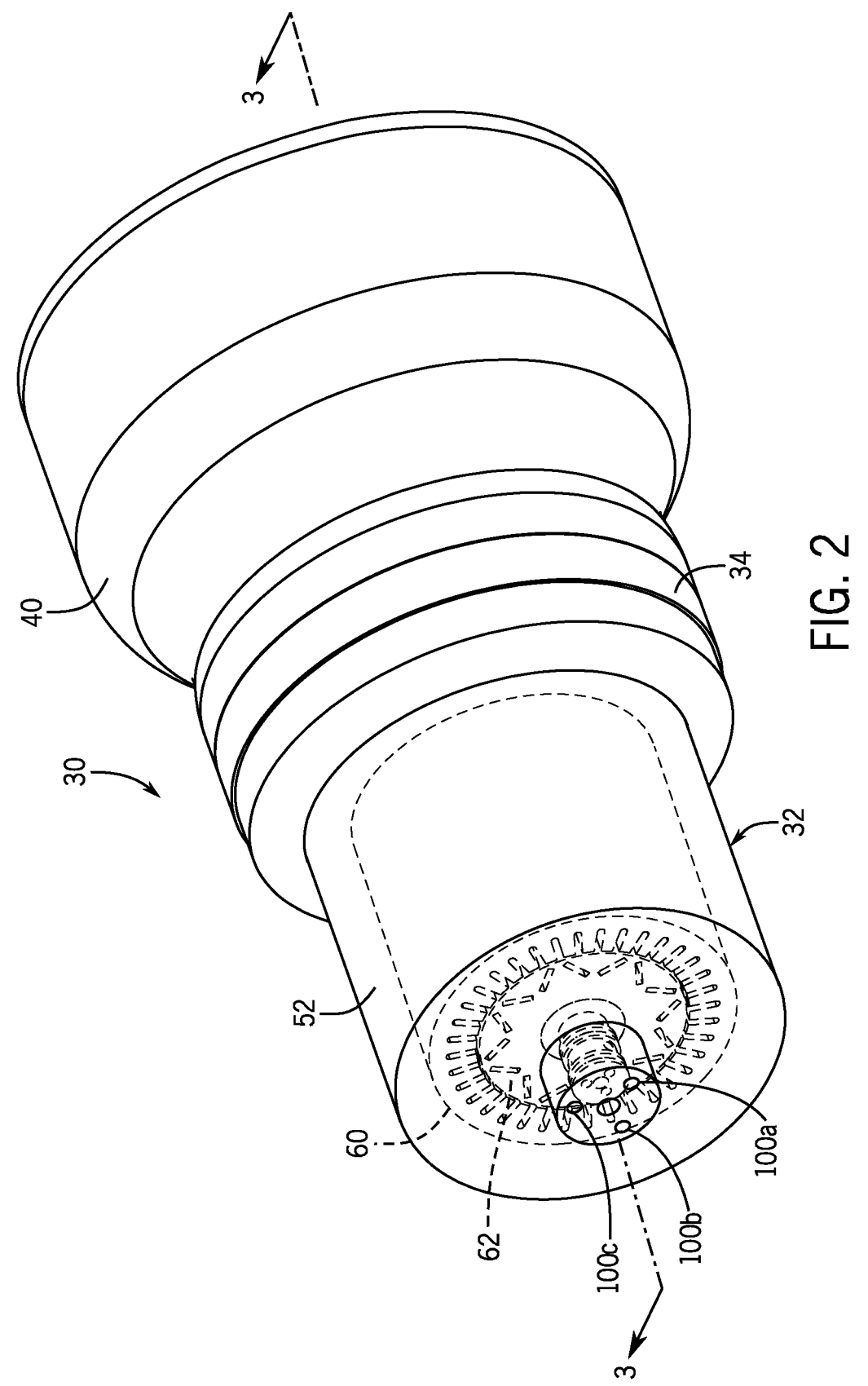
FIG. 2 is an isometric view of a wheel end drive of the example work vehicle of FIG. 1 in which the rotor cooling arrangement and electric machine are incorporated.
Figure 3:
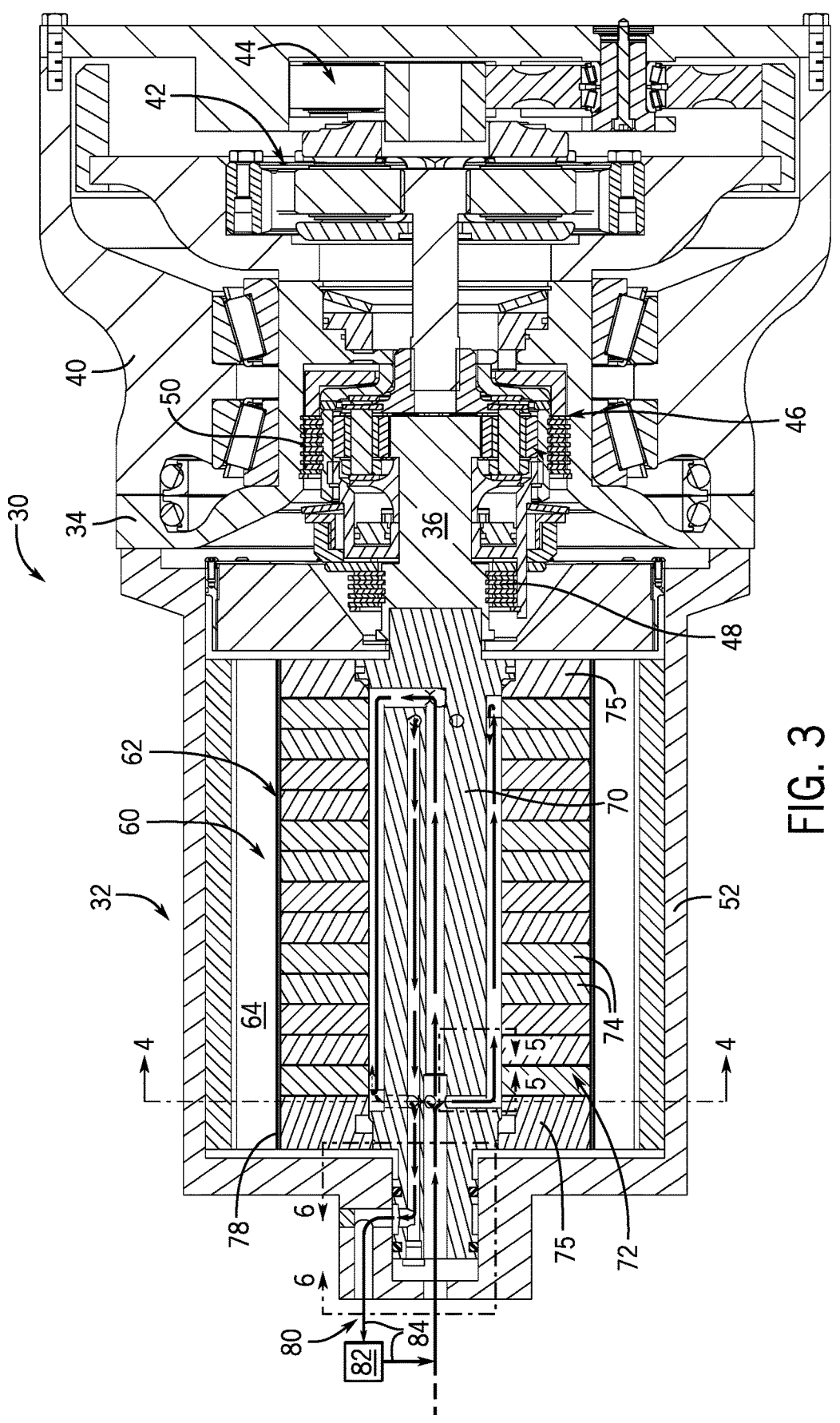
FIG. 3 is a sectional view thereof taken along line 3-3 of FIG. 2.

Referring also to FIGS. 2 and 3, the drive train of the work vehicle 10 may include a drive assembly, which may include a wheel end unit 30 (or "final" drive) located in the drive train immediately upstream, and coupled to and driving, each of the ground-engaging wheels or tracks 16. The wheel end drive unit 30 generally includes a mounting assembly (not shown) to facilitate attachment to the chassis 14 of the work vehicle 10 and configured to support the wheel end unit 30 in a fixed manner during operation of the work vehicle 10. A drive motor 32 may be attached to a drive housing 34 (e.g., via a motor mount) at an axial end of the wheel end unit 30, such that the drive motor 32 may be held in an appropriately fixed orientation for delivery of rotational power to the wheel end unit 30. The drive motor 32, detailed below, is an electric motor including a drive shaft 36 that interfaces with a gear reduction arrangement 38 of the wheel end unit 30.

The gear reduction arrangement 38 may include a variety of components, such as clutch packs, actuators, and gears (e.g., a planetary gear arrangement described below). The gear reduction arrangement 38 may be configured so that the wheel end unit 30 operates as a single-mode or single-speed power transmission component of the driveline or as a multi-mode or multi-speed component. In the illustrated example, the wheel end unit 30 is operational in multiple modes under manual operator control or autonomous control via the controller 20.

The wheel end unit 30 may generally include a drive hub 40, which may be configured to directly engage the ground-engaging wheels or tracks 16 of the work vehicle 10, such that rotation of the drive hub 40 may drive movement of the ground-engaging wheels or tracks 16, and thereby tractive movement of the work vehicle 10. a hub bearing assembly with one, two, or more wheel bearings configured in a variety of arrangements, and a bearing support configured to provide structural support to the wheel bearing assembly. The drive housing 34 is configured to be securely mounted to the chassis 14 of the work vehicle, while the drive hub 40 is configured to be securely mounted to one of the ground-engaging wheels or tracks 16 of the work vehicle 10.

The example wheel end unit 30 includes a gear reduction arrangement 38 with three planetary gear sets, including two reduction planetary sets 42, 44 and a shifting planetary set 46. The wheel end unit 30, and specifically the shifting assembly thereof, includes two clutch packs 48, 50 that are coupled to the shifting planetary set 46. When the clutch pack 48 is engaged, the wheel end unit 30 operates in a low speed mode. When clutch pack 50 is engaged, the wheel end unit 30 operates in a high speed mode. The wheel end unit 30 operates in a neutral mode when neither clutch pack 48, 50 is engaged and operates in a park mode when both clutch packs 48, 50 are engaged. The example wheel end unit 30 has been described generally above. Detailed 11 discussion of the construction and operation of the wheel end unit 30 is provided at column 5, line 64 to column 9, line 65 of U.S. Pat. No. 10,214,101, which is incorporated by reference as though fully set forth herein.

Figure 3A:
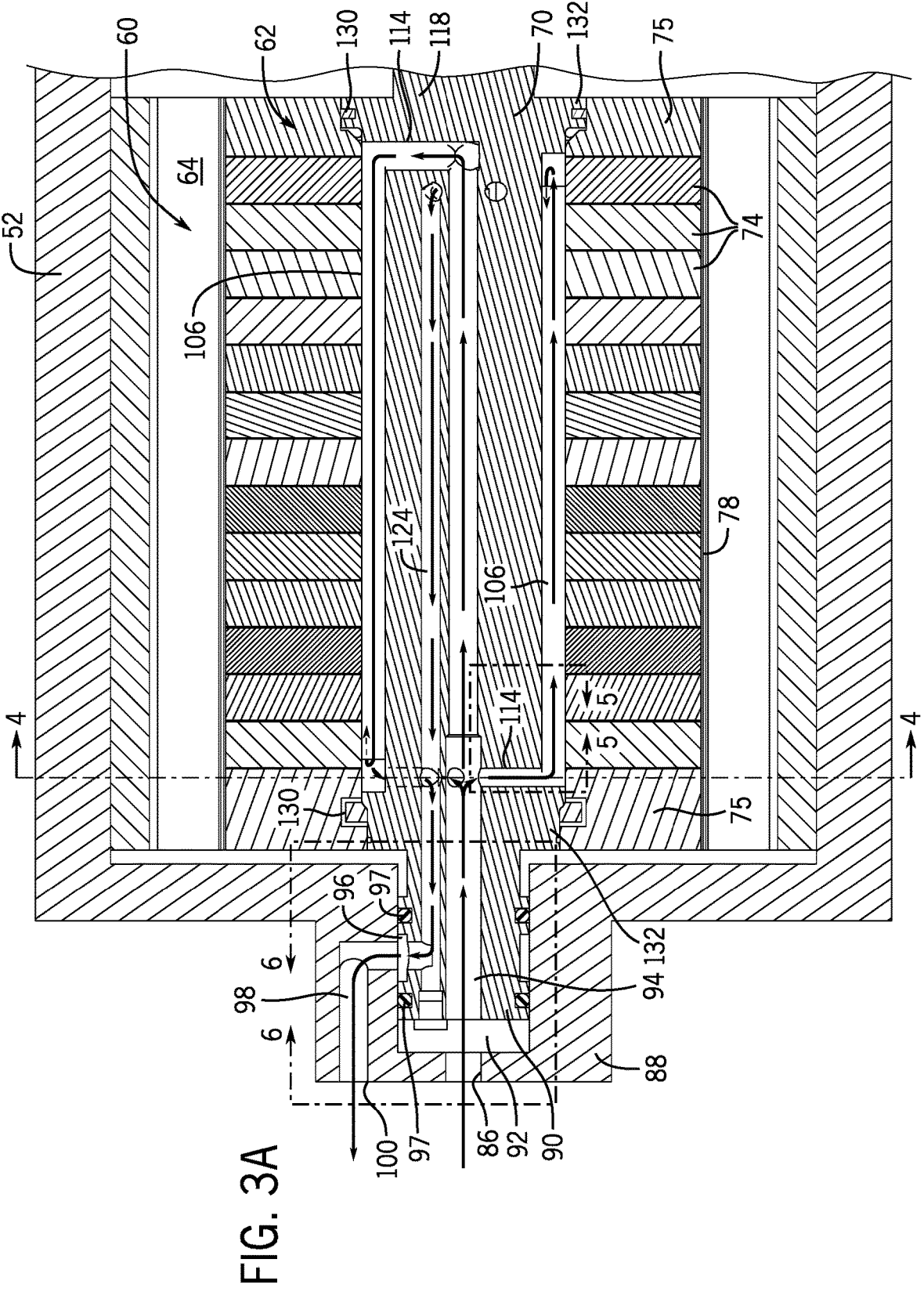
FIG. 3A is an enlarged partial sectional view thereof.

Referring to FIGS. 2, 3 and 3A, the drive motor 32 will now be described. The drive motor 32 has a generally hollow annular (e.g., cylindrical) casing 52 extending about a drive axis A. The drive motor 32 mounts to the drive housing 34 (via bolts or other removable mechanical fasteners, not shown) such that the drive shaft 36 aligns with the drive axis A about which the wheel end unit 30 is concentrically disposed. Rotational power is delivered from the drive motor 32 to the wheel end unit 30 via the drive shaft 36 after which the wheel end unit 30 converts the input power to output power at a different gear ratio (e.g., steeply changed to provide relatively high torque and low speed) for the ground-engaging wheels or tracks 16. One or more connectors (not shown) are arranged on the drive motor casing 52 for wired electrical connection supplying power from the work vehicle power train (e.g., batteries thereof) and providing connection with the controller 20.

Figure 4:
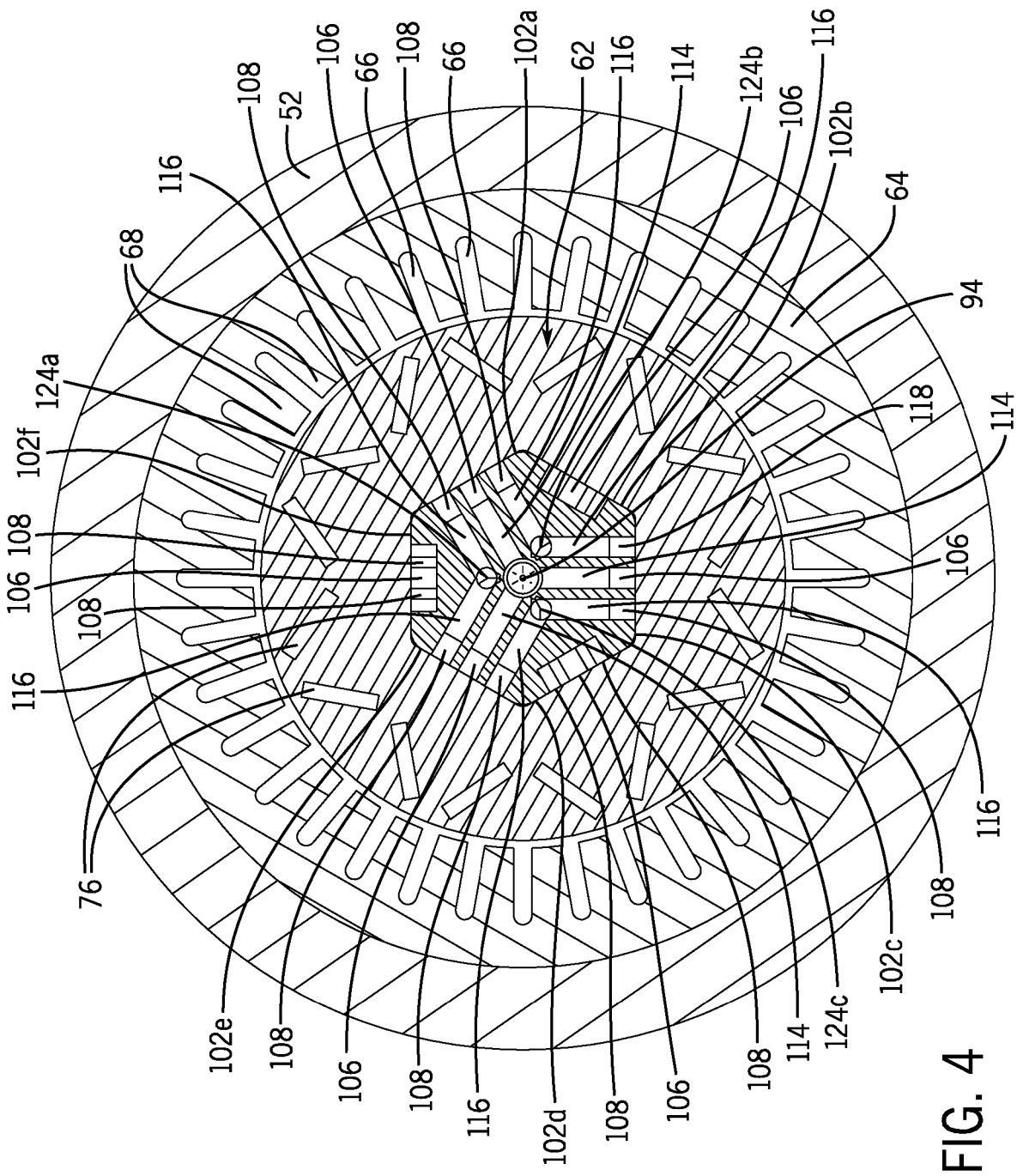
FIG. 4 is a sectional view of taken along line 4-4 of FIG. 3.

The drive motor 32 can be any suitable AC or DC electric motor of various brushed and brushless configurations. The drive motor 32 of the illustrated example is a permanent magnet motor including a stator 60 and a rotor 62. The stator 60 can be of any suitable configuration such as including a core 64 arranged in an annular shape coaxial with the rotor 62 and formed from a solid core material, a plurality of stacked laminations, or a split core material. The stator 60 may have windings or wire coils (not shown) positioned (e.g., wrapped about) radially inner portions of the stator core 64. As shown in FIG. 4, a plurality of slots 66 and a plurality of ribs 68 are arranged alternatively about the radially inner portion of the stator core 64. The plurality of slots and the plurality of ribs 68 extend primarily in the axial direction of the drive axis A and also secondarily in a radial direction relative to the drive axis A. The plurality of slots 66 and the plurality of ribs 68 may be symmetrical and evenly circumferentially spaced about the drive axis A. When assembled, the wire coils of the stator 60 are mounted in the plurality of slots 66 and wrapped around one or more of the plurality of ribs 68.

The rotor 62 has a rotor shaft 70 coupled to (e.g., by cooperating splined connection) and driving the drive shaft 36 to rotate about the drive axis A. The rotor shaft 70 may be supported for rotation relative to the drive motor casing 52 by one or more bearings (e.g., roller bearing assemblies, not shown) mounted proximate each axial end of the drive motor 32. The rotor shaft 70 may be unitarily formed as a single unitary part or an assembly with two or more parts split along the axial or radial dimension of the rotor shaft 70. The rotor 62 also includes a rotor core 72 mounted for co-rotation with the rotor shaft 70. The rotor core 72 is formed from a plurality of rotor discs 74 (mounted between end plates 75) that are separated from one another and encapsulated by a dielectric material 78. Each of the plurality of rotor discs 74 may be a unitary piece or a lamination assembly and configured to carry one or more permanent magnets 76 (in openings or pockets) for magnetic field generation and electromagnetic cooperation with the wire coils of the stator 60. The plurality of permanent magnets 76 are circumferentially spaced about the drive axis A, as shown in FIG. 4, and arranged with alternating polarities so that rotation past the wire coils of the stator 60 induces an alternating electromagnetic field. In the illustrated example, the permanent magnets 76 are arranged in a generally V-shaped repeating configuration, although other configurations are possible.

To reduce heat-related wear on the components of the drive motor 32, the drive motor 32 is provided with a cooling circuit that distributes coolant (e.g., liquid oil) throughout the drive motor 32. This disclosure pertains to cooling the rotor 62, and the following discussion details aspects of the disclosed rotor cooling arrangement. However, it will be understood that the cooling circuit may extend to or otherwise cool components of the stator 60 in addition to (e.g., prior to or after) cooling the rotor 62. To that end, the drive motor casing 52 may include various structures for distributing coolant to or through the stator 60, such as various coolant inlet and outlet ports (not shown) for supplying coolant to the cooling circuit of the drive motor specifically arranged to cool the stator 60. The stator cooling may be achieved with a shared coolant supply or a separate coolant supply as the rotor cooling and may employ common or separate pumps, plumbing lines, fittings, and other components to circulate the coolant, and the cooling circuit may be split into common or separate circuits (e.g., have a stator circuit and a rotor circuit). By way of example, the drive motor casing 52 may include coolant passages (not shown) that are formed at an interior surface of the drive motor casing 52 that communicate with dedicated coolant inlet and outlet ports in the drive motor casing 52. Stator coolant may also be delivered (passively or actively) out of the drive motor 32 to the wheel end unit 30 via suitable internal passages or external plumbing lines and fittings, or coolant may be expelled from the stator 60 directly to a coolant source or other collection area of the cooling system.

A rotor cooling arrangement will now be detailed in the context of the example drive motor 32. Generally, the rotor cooling arrangement is a closed-circuit cooling arrangement in which the fluid path (and thereby the coolant) is contained within the rotor components of the drive motor 32. As a closed system, should stator 60 cooling be provided, it would be at a controlled stage of the cooling system before or after the rotor 62 cooling. For example, the stator 60 would not be cooled by splashing or otherwise directing free flowing coolant from the rotor 62 to the stator 62.

In the illustrated example, the dielectric material 78 of the rotor 62 encapsulates and contains the fluid path within and around the rotor 62 and the rotor shaft 70. As will be described, end seals (e.g., shaft seals, O-rings and the like) may be used to create fluid-tight seals with the rotor shaft 70 at axial ends of the rotor 62. In this closed-circuit arrangement, the coolant is permitted to come in direct physical contact with components of the rotor (e.g., rotor shaft 70, rotor core 72, rotor discs 74, magnets 76) between the axial end seals, while being contained against freely flowing from the rotor 62 into the drive motor casing 52 and possibly causing frictional losses to the drive motor 32, such as windage or other like losses.

Referring to FIGS. 3 and 3A, in one example implementation of a rotor cooling circuit 80 the coolant is delivered from a coolant tank or other source 82 through one or more plumbing lines 84 (via a suitable coupler, not shown) to an inlet opening 86 of a fitting 88 that may be coupled to or integrated with the drive motor casing 52. The fitting 88 receives an axial outer end 90 (relative to the drive motor casing 52) of the rotor shaft 70. The inlet opening 86 is spaced axially away from the axial outer end 90 of the rotor shaft 70 defining an internal volume 92 into which coolant is introduced from the inlet opening 86 before passing into and through an inlet feed passage 94 of the rotor shaft 70, which may run generally along the drive axis A at the radial center of the rotor shaft 70. The inlet feed passage 94 feeds coolant into and through the rotor shaft 70 until in circulates back to the axial outer end 90 where an annular recessed channel 96, which sealed by a pair of seals 97 (e.g., O-rings) on opposite axial sides thereof, and radial outlet passage 98 are located that deliver the returning coolant to a passage 98 of the fitting 88 that in turn leads to an outlet opening 100. One or more plumbing lines 84 may then return the coolant to the coolant tank 82 or other fluid source, possibly first passing through a conditioner (e.g., cooler) or the like. In the illustrated implementation, the annular recessed channel 96 is fed by three radial passages 98 and leads to three outlet openings 100a-100c in the fitting 88, all angularly spaced apart equally about the drive axis A, as shown in FIG. 2.

The configuration of the rotor shaft and the cooling circuit of the rotor cooling arrangement may take various forms, for example, including any number, size, and location of radial (or obliquely angled) passages through the rotor shaft 70, and any number, size, and location of axial, lateral, and/or obliquely angled passages at the outer periphery of the rotor shaft 70. Any suitable geometric, curvilinear, or other flow passage configuration may be used. The rotor shaft 70 may also have any suitable configuration, such as cylindrical (i.e., circular radial cross-section) or multi-sided (i.e., axially faceted) with any number of planar (i.e., flat) or non-planar (e.g., crowned) surfaces extending around the outer periphery in radial cross-section. The faceted configurations may further act as integral torque transfer features that impart rotational torque to the rotor 62.

Figure 5:
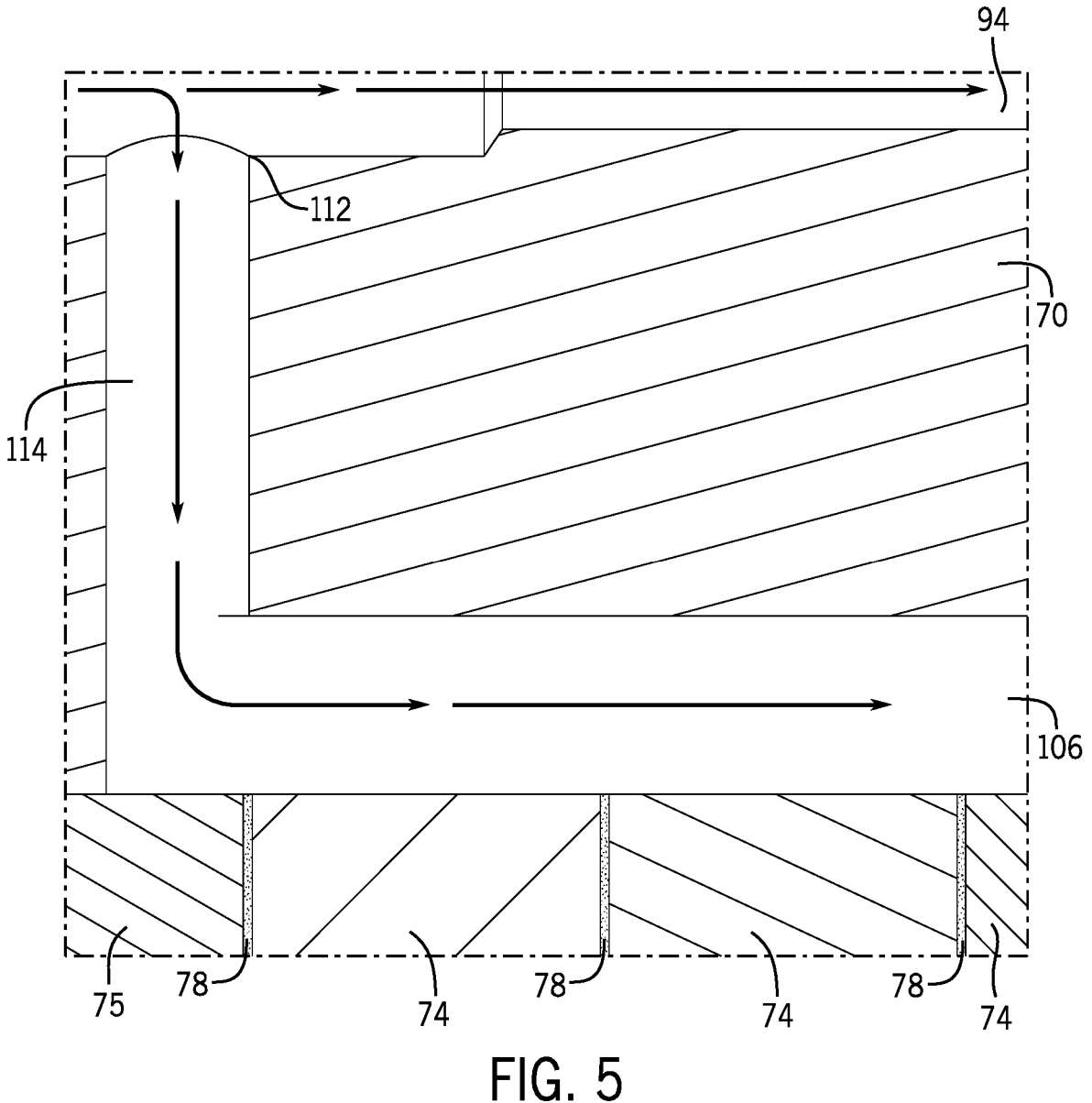
FIG. 5 is an enlarged sectional view of the area 5-5 shown in FIG. 3.
Figure 6:
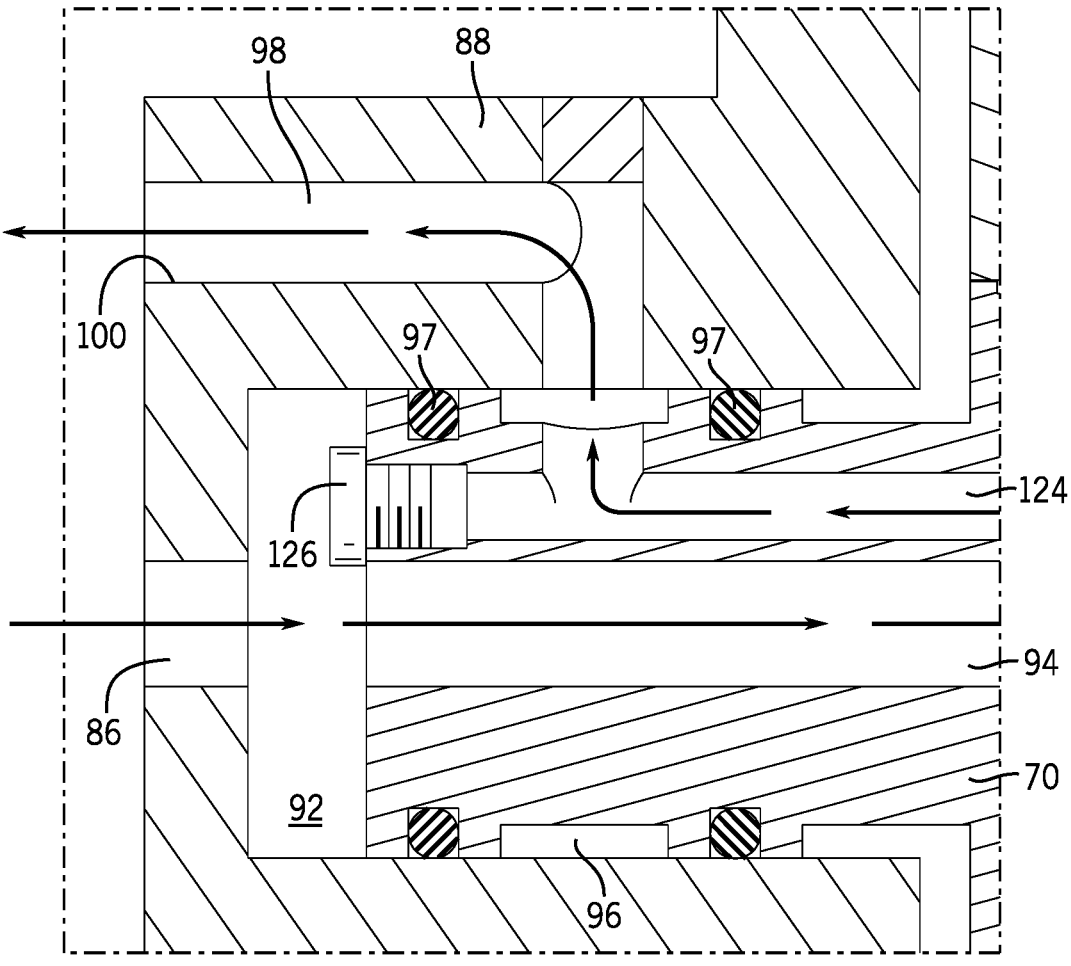
FIG. 6 is an enlarged sectional view of the area 6-6 shown in FIG. 3.
Figure 7:
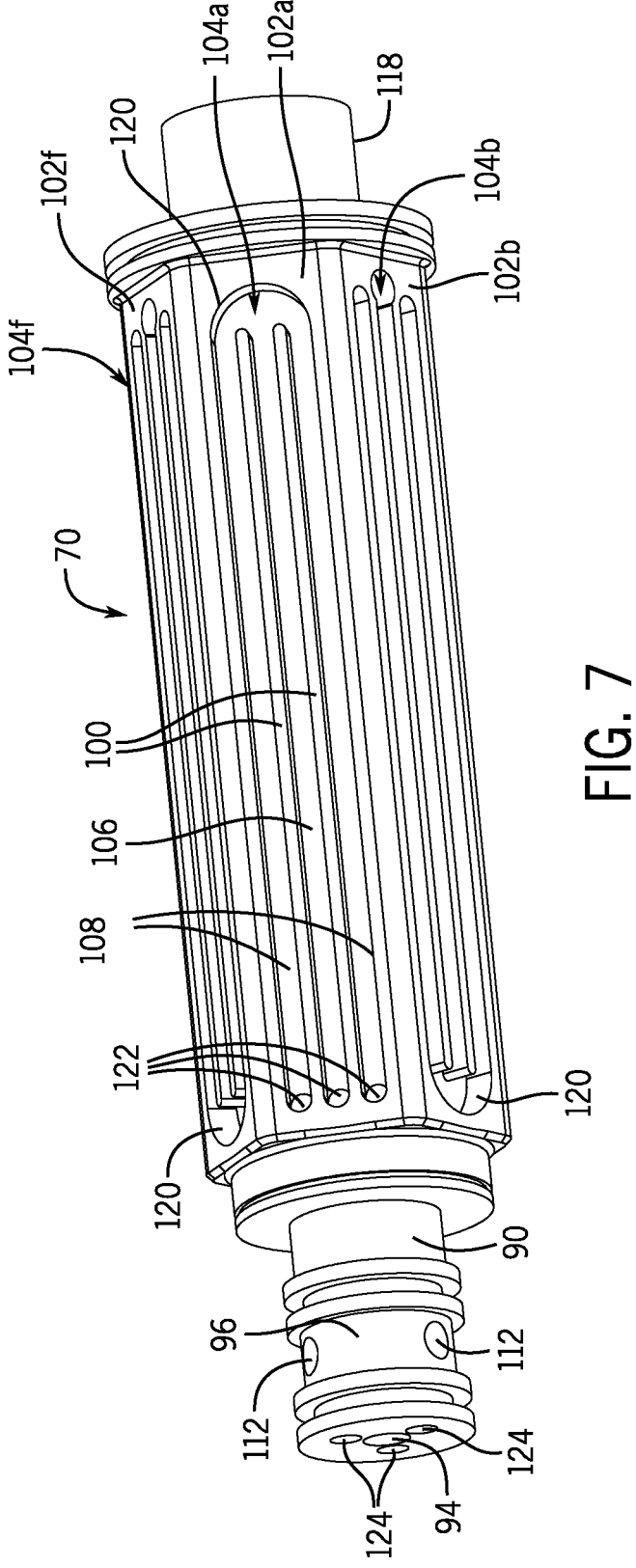
FIGS. 7-9 are views of an example rotor shaft with example serpentine cooling passages at the outer periphery thereof.
Figures 8, 9:
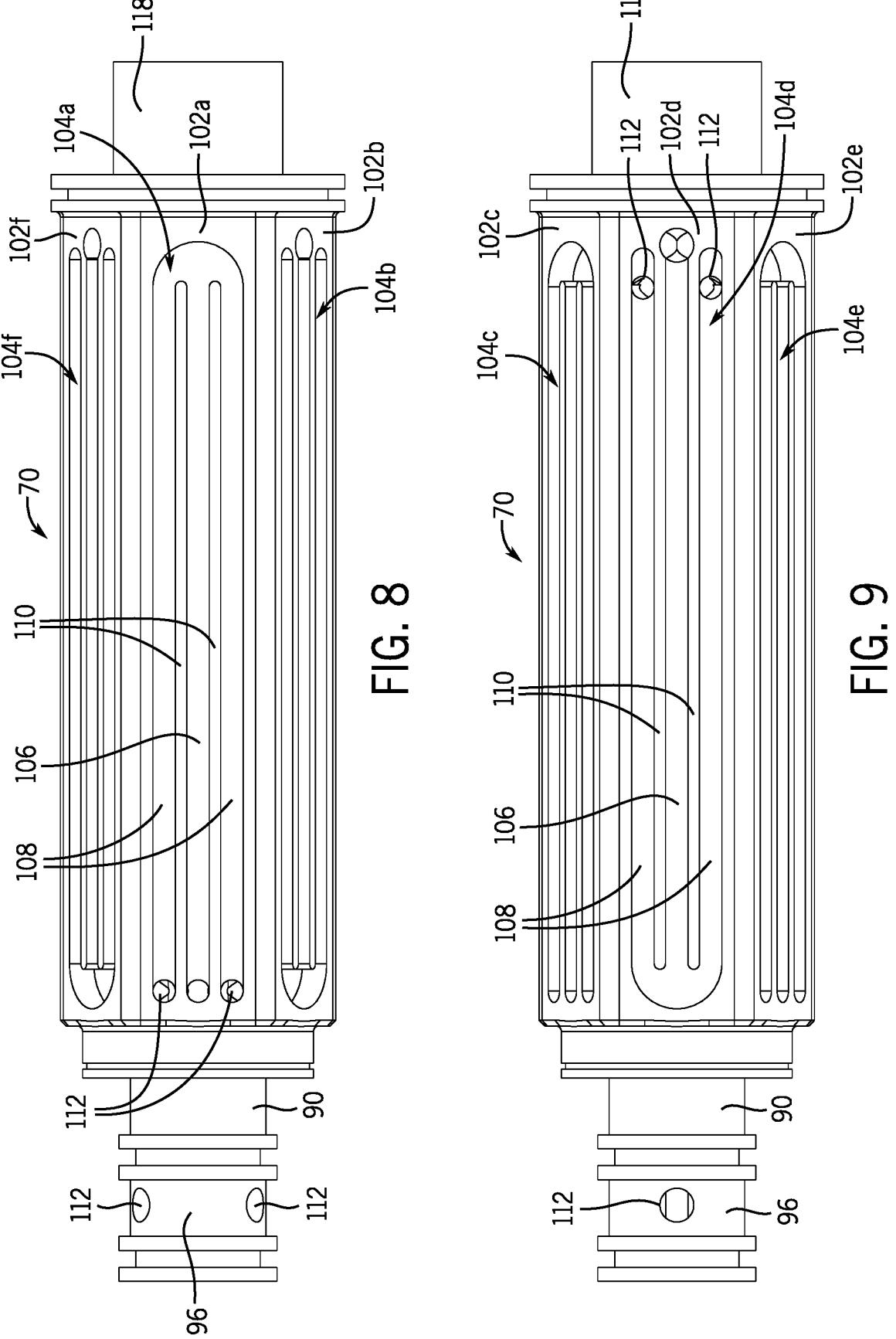

Referring to FIGS. 4 and 7-9, on the illustrated example, the rotor shaft 70 is, in principle part, a hexagonal shaft, with an outer peripheral configured with six flat sides or facets 102 (i.e., 102a-102f) in radial cross-section, as shown in FIG. 4. As shown there, and in FIGS. 8-10, each facet 102 has a cooling convolution triads 104 (i.e., 104a-104f) having three parallel axial passage runs in each cooling convolution 104, including a middle run 106 positioned between two outer runs 108, which are separated from one another by partitions 110. Additional or fewer runs may be provided. All three of the runs 106, 108 are open-sided grooves or channels in which the peripheral side of the rotor shaft 70 adjacent the rotor discs 74 are open. Also, all three runs 106, 108 have radial ports 112 at terminal ends thereof that cooperate with associated radial passages, including a middle radial passage 114 and two outer radial passages 116. As shown in FIGS. 3-5, the coolant is delivered to the cooling convolution triads 104 through the middle radial passage 114 and middle run 106 of each cooling convolution triad 104. The cooling convolution triads 104 are oppositely oriented in consecutive fashion such that for one, for example, cooling convolution triad 104a, coolant passes through the middle run 106 flowing away from the axial outer end 90 and toward an axial inner end 118 of the rotor shaft 70, while in the adjacent two, for example cooling convolution triads 104b and 104f, the coolant flows through the middle runs 106 from the axial inner end 118 toward the axial outer end 90 of the rotor shaft 70. At the terminal ends of the middle runs 106, the coolant encounters an arcuate wall 120 that aids in redirecting the coolant through a 180 degree turn to reverse its flow in the opposite axial direction through the outer runs 108. The coolant then encounters terminal end walls 122 of the outer runs 108 and exits the cooling convolution triads 104 through the radial ports 112. From there, the outer radial passages 116 guide the coolant to three axial outlet passages 124. Like the inlet feed passage 94, these outlet passages 124 may be machined into the rotor shaft 70 using a boring or drilling process followed by closing of the axial outer ends thereof of a suitable plug or cap 126, such as shown in FIG. 6, that may be threaded, press-fit, or otherwise coupled to the rotor shaft 70. These passages are located within the interior of the rotor shaft 70 parallel to and angularly spaced equally about the inlet feed passage 94. As illustrated, in part, in FIG. 4, the middle radial passage 114 feeding coolant to each cooling convolution triad 104 intersects the central inlet feed passage 94. Specifically, there are three middle radial passages 114 at the axial inner end 118 and three at the axial outer end 90. The middle radial passages 114 at the axial outer end 90 feeds coolant to the middle runs 106 of the cooling convolution triads 104a, 104c, and 104e. The middle radial passages 114 at the axial inner end 118 feeds coolant to the middle runs 106 of the cooling convolution triads 104b, 104d, and 104f.

The outer radial passages 116 returning coolant from each cooling convolution triad 104 intersect the three outlet passages 124, thereby being three, for every other cooling convolution triad 104 at the axial inner end 118 and three at the axial outer end 90 of the rotor shaft 70. At the axial outer end 90 of the rotor shaft 70, the outer radial passages 116 are in the same plane as the middle radial passages 114, and at the axial inner end 118, the outer radial passages 116 are offset from the middle radial passages 114 in a parallel plane axially spaced from the plane of the outer radial passages 116. Further, it should be noted that at neither the axial outer end 90 nor the axial inner end 118 do the outer radial passages 116 form a true radius (i.e., they do not extend from the centerline (drive axis A) of the rotor shaft 70), but rather extend in pairs of lines of extension that are obliquely angled relative to, and spaced equal-angularly about, the drive axis A and within an orthogonal planar section through the rotor shaft 70 that is centered on the drive axis A.

Specifically, then, one outer radial passage 116 from each of the cooling convolution triads 104a and 104e intersect the outlet passage 124a, one outer radial passage 116 from each of the cooling convolution triads 104a and 104c intersect the outlet passage 124b, and one outer radial passage 116 from each of the cooling convolution triads 104c and 104e intersect the outlet passage 124c, all at the axial outer end 90 of the rotor shaft 70. At the axial inner end 118 of the rotor shaft 70, one outer radial passage 116 from each of the cooling convolution triads 104f and 104b intersect the outlet passage 124a, one outer radial passage 116 from each of the cooling convolution triads 104b and 104d intersect the outlet passage 124b, and one outer radial passage 116 from each of the cooling convolution triads 104d and 104f intersect the outlet passage 124c. From the outlet passages 124, the coolant flows to the three radial outlet passages and the annular channel 96 to the three associated passages 98 and then exit the drive motor 32 through the outlet openings 100 in the fitting 88.

The rotor cooling arrangement configured in the aforesaid manner allows coolant flowing through the runs 106, 108 of cooling convolution triads 104 to come into direct physical contact with the rotor components, including the rotor discs 74, allowing for conductive heat transfer from the rotor discs 74 (and thereby the magnets 76), as a result of the open-sided configuration of the runs 106, 108. Despite this, the coolant remains contained within the rotor 62 and primarily within the prescribed flow passages due to the close proximity and hydrophobic nature of the dielectric 78 and the rotor discs 74 themselves as well as the presence of shaft seals 130 fit about and in liquid-sealing engagement with the rotor shaft 70 at the axial outer end 90 and axial inner end 118 and mounted at annular surface sections 132 of the rotor shaft 70 and the end plates 75 of the rotor 62, see FIGS. 3 and 6. Containment of the coolant provides operational efficiencies in the reduction in parasitic losses (e.g., windage losses) that may otherwise occur if the coolant were allowed to flow in bulk from the rotor 62 with the drive motor casing 52. Further, in this manner no dedicated sump or drain arrangement are required in the drive motor 32 nor are dedicated pluming lines for draining the coolant from the drive motor 32. Any inadvertent leakage of the coolant from the passages of the rotor cooling circuit 80 is insignificant and would dissipate during operation of the drive motor 32 without imparting efficiency losses.

Moreover, the rotor cooling arrangement disclosed herein, including in the example implementation described above and depicted in the accompanying 24 drawings, also provides for enhanced cooling of the rotor components, principally the rotor discs 74 and magnets 76, by controlling the fluid dynamics of the coolant present within and flowing through the passages of the rotor cooling arrangement 80. Specifically, the through flow rate and dwell time of the coolant within and flowing through the rotor cooling circuit 80 is selected by controlled dimensioning (e.g., cross-sectional diameter) of the axial and radial flow passages internal to the rotor shaft 70 and fitting 88 (i.e., 94, 98, 114, 116, 124), the width and length dimensioning of the runs (i.e., 106, 108) and the number of convolutions of the cooling convolution triads 104, and the dimensioning (e.g., diameter) of the interstitial ports and the annular channel (i.e., 96, 112). To a lesser degree, the seals (i.e., 97, 130) may also serve in the coolant throughput management. Thus, when the drive motor 32 is operating at lower speeds, the rotor cooling arrangement allows for and provides slower flow through the rotor 62, while at higher operating speeds, the pumping action of the passages, particularly the radial passages (i.e., 114, 116) will increase with rotor shaft 70 speed and provide higher coolant throughput, and thereby increased cooling of the rotor 62 during high heat operating conditions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A rotor cooling arrangement for an electric machine used in a drive train of a work vehicle, the electric machine having a housing containing a stator disposed within the housing in a fixed position about a rotation axis, the rotor cooling arrangement including:

a rotor disposed within the housing about the rotation axis, the rotor having a series of rotor discs with pockets in which magnets are disposed, the rotor discs being separated from each other along the rotation axis by a dielectric; and

a rotor shaft extending along the rotation axis and coupled to the rotor to corotate relative to the stator about the rotation axis, the rotor shaft having a multi-sided cross section with multiple facets at which are defined, in part, a cooling circuit through which flows a coolant for cooling the rotor, the cooling circuit includes a feed passage internal to the rotor shaft communicating with a cooling passage, in the form of an open groove in an outer surface of the rotor shaft, communicating with an outlet opening spaced along the rotation axis from the rotor;

wherein the rotor closes off the open groove such that the cooling circuit is a closed loop circuit in which the coolant circulates through the rotor shaft from the feed passage to the cooling passage to the outlet opening.

2. The rotor cooling arrangement of claim 1, wherein the rotor is physically adjacent to the cooling passage such that the coolant within the cooling passage comes in direct physical contact with the rotor discs.

3. The rotor cooling arrangement of claim 1, further including a first seal and a second seal, the first seal configured to effect a first liquid tight seal between the rotor shaft and a first side of the rotor, and the second seal configured to effect a second liquid tight seal between rotor shaft and a second side of the rotor;

wherein the cooling passage is disposed about the rotation axis between the first seal and the second seal.

4. The rotor cooling arrangement of claim 1, wherein there are multiple cooling passages formed as open grooves in the outer surface of the rotor shaft; and wherein there are multiple outlet openings.

5. The rotor cooling arrangement of claim 4, wherein the cooling passages include multiple sets of convolutions, each of the sets of convolutions communicating with the feed passage and one of the outlet openings.

6. The rotor cooling arrangement of claim 5, wherein each of the sets of convolutions includes one or more parallel runs of the cooling passages.

7. The rotor cooling arrangement of claim 6, wherein the parallel runs are aligned with the rotation axis.

8. The rotor cooling arrangement of claim 5, wherein each of the sets of convolutions is physically isolated from the other sets of convolutions in an angular direction about the rotation axis.

9. The rotor cooling arrangement of claim 5, wherein one of the sets of convolutions is located at each facet of the rotor shaft.

10. The electric machine of claim 9, wherein the rotor shaft defines a first annular surface and a second annular surface with the cooling passages disposed about the rotation axis between the first annular surface and the second annular surface;

further including a first seal and a second seal, the first seal configured to effect a first liquid tight seal between the first annular surface of the rotor shaft at a first side of the rotor, and the second seal configured to effect a second liquid tight seal between the second annular surface of the rotor shaft at a second side of the rotor.

11. An electric machine for use in a drive train of a work vehicle, the electric machine comprising:

a housing;

a stator disposed within the housing in a fixed position about a rotation axis;

a rotor disposed within the housing about the rotation axis, the rotor having a series of rotor discs with pockets in which magnets are disposed, the rotor discs being separated from each other along the rotation axis by a dielectric; and a rotor shaft extending along the rotation axis and coupled to the rotor to corotate relative to the stator about the rotation axis, the rotor shaft having a multi-sided cross section with multiple facets at which are defined, in part, a cooling circuit through which flows a coolant for cooling the rotor, the cooling circuit includes a feed passage internal to the rotor shaft communicating with a cooling passage, in the form of an open groove in an outer surface of the rotor shaft, communicating with an outlet opening spaced along the rotation axis from the rotor;

wherein the rotor closes off the open groove such that the cooling circuit is a closed loop circuit in which the coolant circulates through the rotor shaft from the feed passage to the cooling passage to the outlet opening.

12. The electric machine of claim 11, wherein the rotor is physically adjacent to the cooling passage such that the coolant within the cooling passage comes in direct physical contact with the rotor discs.

13. The electric machine of claim 11, further including a first seal and a second seal, the first seal configured to effect a first liquid tight seal between the rotor shaft and a first side of the rotor, and the second seal configured to effect a second liquid tight seal between the rotor shaft and a second side of the rotor;

wherein the cooling passage is disposed about the rotation axis between the first seal and the second seal.

14. The electric machine of claim 11, wherein there are multiple cooling passages formed as open grooves in the outer surface of the rotor shaft; and wherein there are multiple outlet openings.

15. The electric machine of claim 14, wherein the cooling passages include multiple sets of convolutions, each of the sets of convolutions communicating with the feed passage and one of the outlet openings.

16. The electric machine of claim 15, wherein each of the sets of convolutions includes one or more parallel runs of the cooling passages.

17. The electric machine of claim 16, wherein the parallel runs are aligned with the rotation axis.

18. The electric machine of claim 15, wherein each of the sets of convolutions is physically isolated from the other sets of convolutions in an angular direction about the rotation axis.

19. The electric machine of claim 15, wherein one of the sets of convolutions is located at each facet of the rotor shaft.

20. The electric machine of claim 19, wherein the rotor shaft defines a first annular surface and a second annular surface with the cooling passages disposed about the rotation axis between the first annular surface and the second annular surface;

further including a first seal and a second seal, the first seal configured to effect a first liquid tight seal between the first annular surface of the rotor shaft and a first side of the rotor, and the second seal configured to effect a second liquid tight seal between the second annular surface of the rotor shaft and a second side of the rotor.

* * * * *